(12) United States Patent
Shi (10) Patent No.: US 12,128,327 B1
(45) Date of Patent: Oct. 29, 2024

(54) CONTINUOUS ELECTRIC FLYING DISC LAUNCHER

(71) Applicant: Dongguan Hongyu Plastic Co., Ltd., Guangdong (CN)

(72) Inventor: Juying Shi, Guangdong (CN)

(73) Assignee: Dongguan Hongyu Plastic Co., Ltd., Guangdong (CN)

( * ) Notice: Subject to any disclaimer, the term of this patent is extended or adjusted under 35 U.S.C. 154(b) by 0 days.

(21) Appl. No.: 18/766,771

(22) Filed: Jul. 9, 2024

(30) Foreign Application Priority Data

May 7, 2024 (CN) .......................... 202420979437.3

(51) Int. Cl.
| | |
|---|---|
| *A63H 27/14* | (2006.01) |
| *A63H 33/18* | (2006.01) |
| *A63H 33/22* | (2006.01) |
| *A63H 33/26* | (2006.01) |

(52) U.S. Cl.
CPC ............. *A63H 33/18* (2013.01); *A63H 27/14* (2013.01); *A63H 33/22* (2013.01); *A63H 33/26* (2013.01)

(58) Field of Classification Search
CPC ................................ A63H 27/12; A63H 27/14
See application file for complete search history.

(56) References Cited

U.S. PATENT DOCUMENTS

| | | | | |
|---|---|---|---|---|
| 2,189,763 A | * | 2/1940 | Schimpfle | A63H 27/14 124/37 |
| 2,731,767 A | * | 1/1956 | Holt | A63H 27/14 244/17.11 |
| 3,473,256 A | * | 10/1969 | Tyler | A63H 27/14 446/38 |
| 3,570,467 A | * | 3/1971 | Belokin, Jr. | F41J 9/18 124/31 |
| 4,781,642 A | * | 11/1988 | Stanzel | A63H 27/14 446/45 |
| 5,125,862 A | * | 6/1992 | Paranto | A63H 27/14 446/236 |
| 6,758,203 B1 | * | 7/2004 | Wu | F41J 9/30 446/45 |
| 7,481,691 B2 | * | 1/2009 | Sze | A63H 27/12 446/45 |
| 2009/0013983 A1 | * | 1/2009 | Polk, III | A63H 27/14 124/6 |

* cited by examiner

*Primary Examiner* — John A Ricci
(74) *Attorney, Agent, or Firm* — Cooper Legal Group, LLC (57) ABSTRACT

The present application relates to a continuous electric flying disc launcher, including a housing, a power supply module, a power assembly, a flying disc body, a limit assembly, a trigger, and an ejector. The housing acts as a carrier, the power supply module is installed in the housing, the power assembly drives a rotation of the flying disc body. A plurality of the flying disc bodies are sleeved on the power output shaft on top of each other. The limit assembly is positioned in the housing and configured to keep remaining flying disc bodies. The ejector is slidably arranged in the housing along a vertical direction, configured to eject the flying disc body. The trigger is arranged in the housing, configured to trigger the power supply module and control an action of the ejector.

9 Claims, 5 Drawing Sheets

CONTINUOUS ELECTRIC FLYING DISC LAUNCHER

CROSS-REFERENCE TO RELATED APPLICATION

This application claims the priority and benefit of Chinese patent application serial no. 202420979437.3, filed on May 7, 2024. The entirety of Chinese patent application serial no. 202420979437.3 is hereby incorporated by reference herein and made a part of this specification.

TECHNICAL FIELD

The present application relates to the technical field of toy flying disc, and, in particular, to a continuous electric flying disc launcher.

BACKGROUND

Bamboo dragonfly is one of the traditional folk toys for a child in China, which is widely played around China. A take-off principle of the bamboo dragonfly is as follows: when a rotor rotates, rotating blades push the air downwards to create a strong wind, and the air also provides an upward reaction lift to the bamboo dragonfly, which changes with a tilt angle of the blades. That is, a greater tilt angle results in greater lift, while a smaller tilt angle results in less lift. Currently, there are electric toys utilizing the principle of the bamboo dragonfly on the market. When the launcher is actuated, it drives the flying disc with tilted blades to rotate rapidly, driving the flying disc to take off. However, existing launchers can only launch one flying disc for one time after it is installed on the launcher, which not only causes inconvenience to a user but also reduces fun of the game.

BRIEF SUMMARY

In order to improve the convenience and fun of using a continuous flying disc launcher, the present application provides a continuous electric flying disc launcher.

The continuous electric flying disc launcher provided by the present application adopts the following technical solution.

A continuous electric flying disc launcher, including a housing, a power supply module, a power assembly, a flying disc body, a limit assembly, a trigger, and an ejector; wherein the housing acts as a carrier, the power supply module is installed in the housing, the power assembly comprises a motor and a power output shaft, the motor is installed in the housing, the motor is connected to the power supply module, the motor is configured to drive the power output shaft to rotate, the power output shaft extends beyond the housing, a plurality of the flying disc bodies are sleeved on the power output shaft on top of each other, a side wall of the power output shaft is fixed with a first convex block, an inner wall of the flying disc body is fixed with a second convex block, the first convex block abuts against the second convex block of an uppermost flying disc body, the limit assembly is positioned in the housing, the limit assembly is configured to limit remaining flying disc bodies, the ejector is slidably arranged in the housing along a vertical direction, the ejector is configured to eject the flying disc body, and the trigger is arranged in the housing, and the trigger is configured to trigger the power supply module and control an action of the ejector.

By adopting the above technical solution, the user controls the trigger to slide, the trigger triggers the power supply module, and the power supply module provides power to the motor, which starts and begins to rotate, driving the power output shaft to rotate together. A plurality of the flying disc bodies are sleeved on the power output shaft on top of each other, with the first convex block on the power output shaft abutting against the second convex block on the flying disc body, thereby driving an topmost flying disc body to rotate synchronously, and through the limit assembly to ensure that only the topmost flying disc body can be launched. When the user releases the trigger, it resets, controlling the action of the ejector to push out the launched flying disc body. At the same time, with the launched flying disc body is pushed out, a new flying disc body automatically ascends to the topmost position, ready for the next launch. This enables continuous launching of flying disc. Each time the trigger is actuated, the motor drives the power output shaft to rotate, and the ejector pushes out the flying disc body stacked on top for launching. Meanwhile, the limit assembly keeps a movement of remaining flying disc bodies, and the ejector pushes out the launched flying disc body to make room for a new one. Users can continuously actuate the trigger to enjoy the fun and convenience of continuous flying disc launching.

In some embodiments, the limit assembly is cylindrical, a side wall of the limit assembly is defined with a first limit groove into which the second convex block is inserted, the side wall of the limit assembly is fixed with a limit block, the inner wall of the flying disc body is defined with a second limit groove into which the limit block is inserted.

By adopting the above technical solution, the engagement between the first limit groove and the second limit groove as well as between the limit block and the second limit groove limits a rotation of the flying disc body. This ensures that while the topmost flying disc body rotates, the remaining flying disc bodies remain stable.

In some embodiments, the power assembly further includes a support and a gear assembly, the support is fixed in the housing, the limit assembly is integrated with the support, the support is defined with a receiving groove, the motor is arranged in the receiving groove, and the power output shaft is rotatably supported on the support; the gear assembly is arranged between the power output shaft and the motor, and the power output shaft extends in a same direction as that of the motor.

By adopting the above technical solution, the support is fixed in the housing, and the motor is arranged in the receiving groove of the support, effectively saving space. Additionally, since the motor and the power output shaft are oriented in the same direction, an internal space of the housing can be fully utilized, allowing the whole power assembly to be more compactly installed in the continuous flying disc launcher without taking up too much space. Moreover, the support and motor are closely mounted together, which ensures a stable transmission process. The gear assembly arranged between the power output shaft and the motor, so that power can be effectively transmitted to mechanical parts of the flying disc launcher, thus ensuring stability and reliability during the flying disc launching.

In some embodiments, a side wall of the trigger is defined with a first guide groove, the first guide groove assumes a Z-shaped shape along the vertical direction; a side wall of the ejector is fixed with a slider, the slider is slidably arranged in the first guide groove along a direction of the first guide groove, and a first resetting spring is arranged between the trigger and the housing to realize resetting of the trigger.

By adopting the above technical solution, in an initial state, the slider of the ejector is positioned at the bottom of the first guide groove. When the trigger is pulled, the slider moves relative to the trigger, causing the ejector to rise under an action of the first guide groove. As the ejector moves upward, the trigger resets under an action of the first resetting spring, and the upper one of the several flying disc bodies below is pushed by the ejector to a position not limited by the limit assembly, enabling it to be rotated by a power output when a next pull of the trigger.

In some embodiments, the side wall of the trigger is defined with a second guide groove, a first end of the second guide groove is connected with a top of the first guide groove, and a second end of the second guide groove extends downward to a bottom of the trigger, a displacement limit assembly is further arranged between the trigger and the housing, and the displacement limit assembly is configured to control a displacement stroke of the trigger.

By adopting the above technical solution, after all the flying disc bodies have been launched, the ejector moves to the top, and the slider moves to the top of the first guide groove. At this point, the displacement limit assembly is triggered to release limits on the displacement of the trigger. The trigger moves horizontally, and due to the second guide groove is connected to the first guide groove, the slider moves to the top of the second guide groove. Furthermore, since the second end of the second guide groove extends downward, the slider slides to the bottom of the second guide groove, causing the ejector to reset downward.

In some embodiments, the displacement limit assembly comprises a slide frame and a second resetting spring, the slide frame is slidably arranged along a horizontal direction, one end of the slide frame is connected to the housing via the second resetting spring, the slide frame is provided with a blocking part and defined with a positioning groove, a side wall of the blocking part abuts against that of the trigger, and the positioning groove is positioned at one side of the blocking part, and, wherein, when the slide frame is moved horizontally by a distance, the blocking part is separated from the trigger, the positioning groove makes way for the trigger, and the slider is correspondingly moved into the second guide groove.

By adopting the above technical solution, in a natural state, the block part of the slide frame blocks the trigger, limiting a lateral movement stroke of the trigger, thereby preventing the slider of the ejector from entering the second guide groove of the trigger. When the slide is pressed down, the positioning groove makes way for the trigger, and the trigger can move horizontally under a drive of the first resetting spring, and the slider of the ejector enters the second guide groove, causing the ejector to drop downward. After the slide frame resets under a drive of the second resetting spring, the ejector drives the trigger to move so that the trigger leaves form the positioning groove and is once again limited by the block part of the slide frame.

In some embodiments, the power supply module comprises a main control board, a battery, a control switch, and a proximity switch, the main control board is electrically connected to the battery, the proximity switch is fixed on the main control board and positioned on one side of the trigger, the control switch is fixed on the housing, and a button is slidably arranged on the housing at a position corresponding to that of the control switch, and both of the control switch and the proximity switch are electrically connected to the main control board.

By adopting the above technical solution, the main control board obtains power by being connected to the battery. The proximity switch is fixed on the main control board and is positioned on one side of the trigger. When the proximity switch senses a proximity of the trigger, the proximity switch will send a signal to the main control board. The control switch is fixed on the housing, and the button corresponds to the position of the control switch. When the button is pressed, the control switch sends a signal to the main control board. After the main control board receives the signal sent by the control switch, the main control board works accordingly. When the main control board receives the signal from the proximity switch, the main control board triggers an action of the motor based on a preset logic. Therefore, when either the proximity switch or the control switch is triggered, the main control board controls the motor to perform a corresponding action.

In some embodiments, the continuous electric flying disc launcher further includes a light assembly, the light assembly includes an LED light board and a lampshade, the LED light board is fixed on the housing and inclined towards an upper side of the flying disc body, the lampshade is inserted in the housing, the LED light board is electrically connected to the main control board, and the lampshade is positioned on one side of the LED light board.

By adopting the above technical solution, the LED light board is fixed on the housing and inclined towards the upper side of the flying disc body, and the lampshade is inserted in the housing, positioned on one side of the LED light board. The LED light board is electrically connected to the main control board, which controls the lighting and extinguishing of the LED. When the user presses the trigger or launches the flying disc, the main control board can control the LED light board to light up according to the preset logic. During a flight of the flying disc, a flashing effect of the LED light board increases a visibility of the flying disc and adds fun and experience to the game. Through a design of the light assembly, the continuous electric flying disc launcher is more interesting and visually appealing during use, providing users with a richer gaming experience.

In some embodiments, the flying disc body comprises a bottom cover, a body, a light bead, and a kinetic energy circuit board, the body covers an upper surface of the bottom cover, the light bead and the kinetic energy circuit board are arranged in the body, the light bead penetrates downward through a lower surface of the bottom cover, and the light bead is electrically connected to the kinetic energy circuit board.

By adopting the above technical solutions, when the flying disc is thrown and begins to rotate, the kinetic energy circuit board senses motion and generates corresponding electrical signals. These signals are transmitted to the light beads, triggering them to light up. Because the light bead penetrates downward through the lower surface of the bottom cover, when the flying disc rotates, the lights will flash during the flight of the flying disc, increasing the visibility and fun of the flying disc.

In summary, the present application includes at least one of the following beneficial technical effects.

1. By controlling the slide of the trigger, the user starts the power supply module to drive the motor to rotate, driving the stacked flying disc bodies to rotate. The limit assembly ensures that only the top flying disc body can be launched, while the ejector pushes out the launched flying disc and prepares the position for the next one. This allows the user to continuously actuate the trigger and enjoy the fun and convenience of continuously launching flying disc.

2. When the user presses the trigger or launches the flying disc, the main control board can control the LED light board to light up according to the preset logic. During the flight of the flying disc, the flashing effect of the LED light board increases the visibility of the flying disc and adds fun and experience to the game.

DETAILED DESCRIPTION

With reference to FIG. 1-5, the present application will be further described in details.

Figure 1:
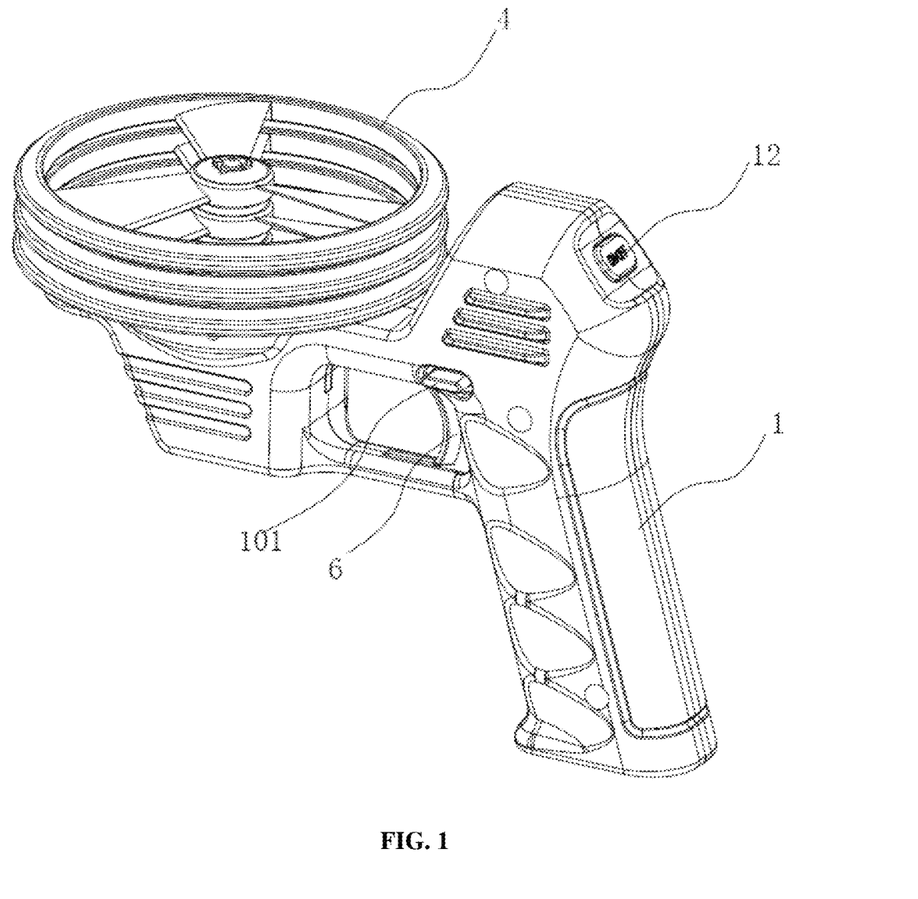
FIG. 1 is a schematic view of an overall structure of an embodiment in the present application.
Figure 2:
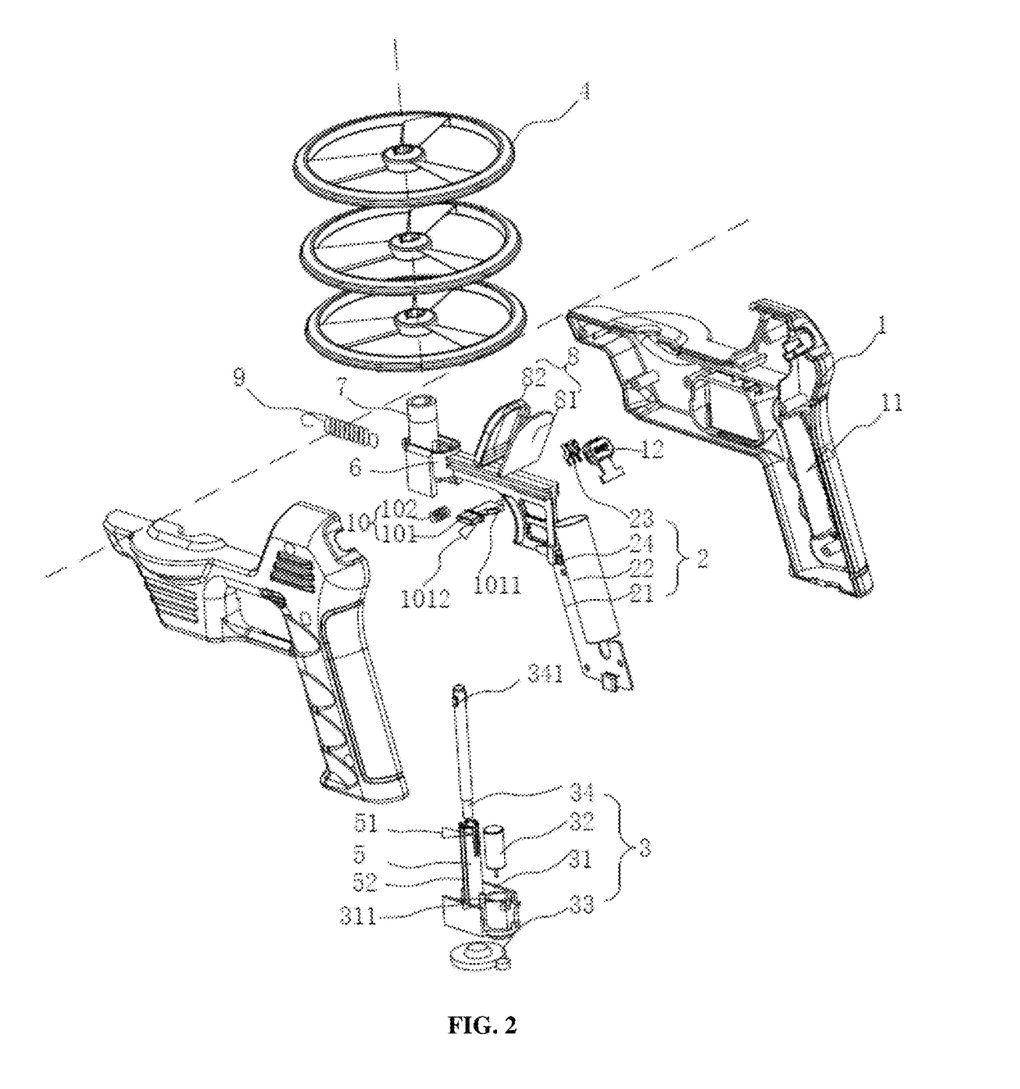
FIG. 2 is an exploded schematic view of an embodiment in the present application.

A continuous electric flying disc launcher is disclosed in the embodiment of the present application. Referring to FIGS. 1 and 2, the continuous electric flying disc launcher includes a housing 1, a power supply module 2, a power assembly 3, a flying disc body 4, a limit assembly 5, a trigger 6, an ejector 7, and a light assembly 8. The housing 1 acts as a carrier, and there are a plurality of the flying disc bodies 4. The power supply module 2 supplies power to the power assembly 3 and the light assembly 8 of the launcher. The power assembly 3 is configured to drive a launch of the flying disc body 4, while the limit assembly 5 is configured to limit a number of flying disc bodies 4 to be launched in a single launch. The trigger 6 is configured to trigger the power supply module 2 and control an action of the ejector 7, which sequentially launches the flying disc body 4. The light assembly 8 is configured to display lights.

Specifically, the housing 1 has a hollow interior, consisting of two symmetrically connected shells. The power supply module 2 is installed in the housing 1, including a main control board 21, a battery 22, a control switch 23, and a proximity switch 24. The main control board 21 is arranged in the housing 1. The housing 1 is defined with an accommodating groove 11, and the battery 22 is inserted in the accommodating groove 11. The battery 22 is columnar, and the main control board 21 is electrically connected to the battery 22. Additionally, the proximity switch 24 is fixed on the main control board 21, and the control switch 23 is fixed on the housing 1. A button 12 is slidably arranged on the housing 1, at a position corresponding to that of the control switch 23. Both the control switch 23 and the proximity switch 24 are electrically connected to the main control board 21.

Correspondingly, the power assembly 3 includes a support 31, a motor 32, a gear assembly 33, and a power output shaft 34. The support 31 is fixed in the housing 1, and a top of the support 31 is defined with a receiving groove 311. A shape and size of the receiving groove 311 match those of the motor 32, and the motor 32 is in-built in the receiving groove 311 and is in snap cooperation with the receiving groove 311. At the same time, an output shaft of the motor 32 passes through a bottom of the support 31, the power output shaft 34 is rotatably supported by the support 31, and a bottom end of the power output shaft 34 also passes through the bottom of the support 31. Correspondingly, the gear assembly 33 includes two gears, one of which is coaxially fixed to the output shaft of the motor 32, and the other of which is coaxially fixed to the power output shaft 34, and the two gears are engaged with each other.

Figure 5:
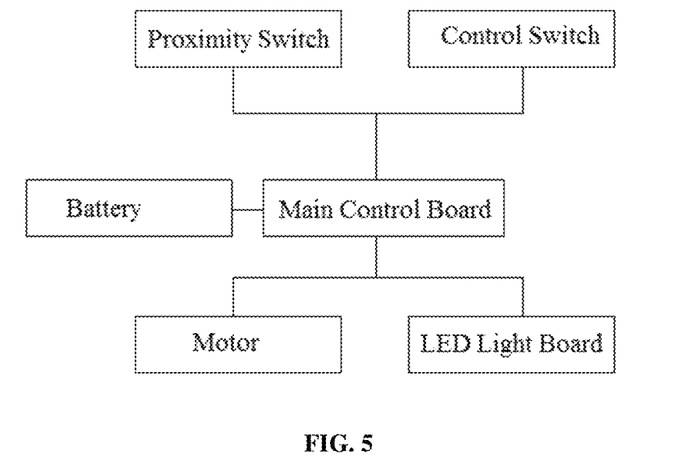
FIG. 5 is a principle block diagram of a circuit in an embodiment of the present application.

Therefore, the main control board 21 obtains power by connecting to the battery 22. The proximity switch 24 is fixed on the main control board 21 and sends a signal to the main control board 21 when it senses an object approaching. The control switch 23 is fixed on the housing 1, at a position corresponding to that of the control switch 23. When button 12 is pressed, the control switch 23 sends a signal to the main control board 21. After the main control board 21 receives the signal sent by the control switch 23, the main control board 21 works accordingly. When the main control board 21 receives a signal from the proximity switch 24, the main control board 21 triggers an action of the motor 32 based on the preset logic. Therefore, when the proximity switch 24 or the control switch 23 is activated, the main control board 21 controls the motor 32 to perform a corresponding action.

Specifically, when the output shaft of the motor 32 rotates, the motor 32 drives one of the gears to rotate, and due to the two gears are engaged with each other, the other gear also rotates, thereby driving the power output shaft 34 to rotate. A power generated by a rotation of the power output shaft 34 acts on the flying disc body 4.

It is worth noting that the support 31 is fixed in the housing 1, and the motor 32 is inserted in the receiving groove 311 of the support 31, effectively saving space. Furthermore, since the motor 32 and the power output shaft 34 are oriented in the same direction, an internal space of the housing 1 can be fully utilized, allowing the whole power assembly 3 to be installed more compactly inside the continuous electric flying disc launcher without taking up excessive space. Additionally, a transmission process is more stable because the support 31 and the motor 32 are closely mounted together. The gear assembly 33 is positioned between the power output shaft 34 and the motor 32, ensuring an effective transmission of power to mechanical components of the flying disc launcher, thereby ensuring stability and reliability when launching the flying disc body 4.

Correspondingly, there are a plurality of the flying disc bodies 4. In this embodiment, there are three flying disc bodies 4. The power output shaft 34 extends beyond the housing 1, and the three flying disc bodies 4 are sleeved on the power output shaft 34 on top of each other.

Figure 4:
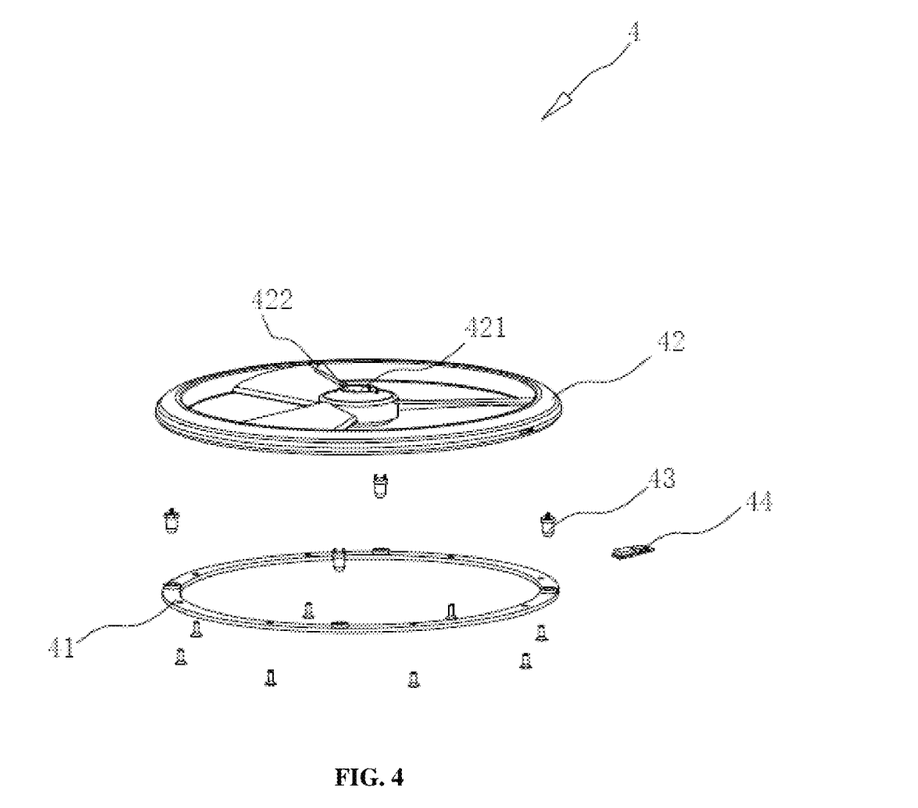
FIG. 4 is an exploded schematic view of a flying disc body in an embodiment of the present application.

Referring to FIGS. 2 and 4, correspondingly, a side wall of the power output shaft 34 is fixed with a first convex block 341, which is positioned on the top side wall of the power output shaft 34. An inner wall of the flying disc body 4 is fixed with a second convex block 421, and the first convex block 341 abuts against the second convex block 421 of an uppermost flying disc body 4.

Therefore, when the motor 32 is started and begins to rotate, the motor 32 drives the power output shaft 34 to rotate together. A plurality flying disc bodies 4 are stacked on the power output shaft 34, and the first convex block 341 on the power output shaft 34 abuts against the second convex block 421 of the flying disc body 4, thereby driving the topmost flying disc body 4 to rotate synchronously.

During this process, to prevent the remaining flying disc bodies 4 from being ejected, the limit assembly 5 are used. Specifically, the limit assembly 5 is cylindrical, integrated with the support 31, and sleeved on the outer side of the power output shaft 34 below the first convex block 341. A side wall of the limit assembly 5 is defined with a first limit groove 51 into which the second convex block 421 is inserted. Additionally, the side wall of the limit assembly 5 is fixed with a limit block 52, and the inner wall of the flying disc body 4 is defined with a second limit groove 422 into which the limit block 52 is inserted.

The engagement between the first limit groove 51 and the second limit groove 421 as well as that between the limit block 52 and the second limit groove 422 limits the rotation of the flying disc body 4. This ensures that, when the topmost flying disc body 4 rotates, the remaining flying disc bodies 4 remain stable. Furthermore, when the flying disc body 4 needs to be ejected along the vertical direction, the engagement between the first limit groove 51 and the second limit groove 421 as well as between the limit block 52 and the second limit groove 422 serves a guiding function, ensuring a stable flying trajectory of the ejected flying disc body 4.

Correspondingly, to eject the flying disc body 4, the ejector 7 is slidably arranged in the housing 1 along the vertical direction, having open upper and lower ends. The ejector 7 is movably sleeved on an outer side of the limit assembly 5, and a top of the ejector 7 abuts against the bottommost flying disc body 4. That is, under the control of the trigger 6, when the ejector 7 moves upward, the ejector 7 can push out the launched flying disc body 4 to make room for next one and further push the next unlaunched flying disc body 4 into a position for launch.

Correspondingly, the launch of the flying disc body 4 is achieved through the following solution by the trigger 6 and the ejector 7.

Figure 3:
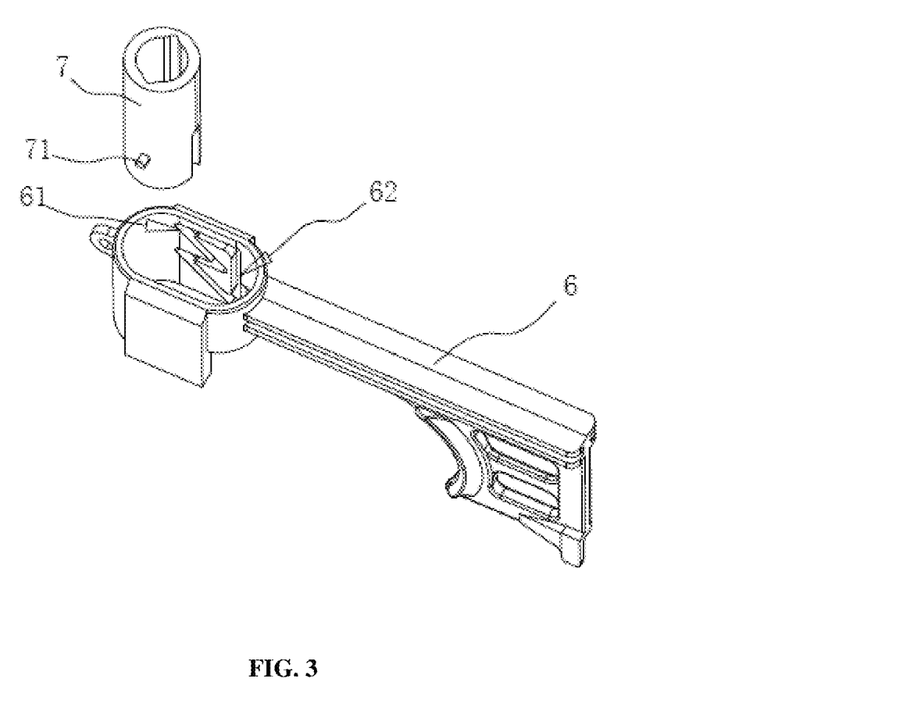
FIG. 3 is a view showing cooperation relationship between a trigger and a ejector in an embodiment of the present application.

Referring to to FIGS. 2 and 3, the trigger 6 is slidably arranged in the housing 1 along the horizontal direction, and a side wall of the trigger 6 is defined with a first guide groove 61. The first guide groove 61 assumes a Z-shaped shape along the vertical direction, with three bends in this embodiment of the present application. At the same time, the side wall of the ejector 7 is fixed with a slider 71, which is slidably arranged in the first guide groove 61 along a direction of the first guide groove 61. A first resetting spring 9 is arranged between the trigger 6 and the housing 1 to realize a reset of the trigger 6. One end of the first resetting spring 9 is hooked to the inner wall of the housing 1, and the other end is hooked to the side wall of the trigger 6. The first resetting spring 9 is arranged along the horizontal direction to provide a force along the horizontal direction to the trigger 6.

Therefore, in an initial state, the slider 71 of the ejector is positioned at the bottom of the first guide groove 61. When the trigger 6 is pulled, the slider 71 is moved relative to the trigger 6, causing the ejector 7 to rise under an action of the first guide groove 61. As the ejector 7 moves upward, the trigger 6 is reset under an action of the first resetting spring 9, and the upper one of two flying disc bodies 4 below is pushed by the ejector to a position not limited by the limit assembly 5, enabling it to be rotated by a power output when the trigger 6 is pulled next time.

Additionally, the trigger 6 is also positioned on the side of the proximity switch 24. When the trigger 6 slides horizontally for a certain distance, the proximity switch 24 is approached by the trigger 6, sending a signal to the main control board 21.

Correspondingly, after all the flying disc bodies 4 have been launched, the ejector 7 needs to be reset. This embodiment of the present application adopts the following solution.

The side wall of the trigger 6 is defined with a second guide groove 62, which is L-shaped. One end of the second guide groove 62 is connected to a top of the first guide groove 61, and the other end extends downward to a bottom of the trigger 6. A displacement limit assembly 10 is further arranged between the trigger 6 and the housing 1 and is configured to control a displacement of the trigger 6.

Therefore, after all the flying disc bodies 4 have been launched, the ejector 7 moves to the top, and the slider 71 moves to the top end of the first guide groove 61. At this point, the displacement limit assembly 10 is triggered to release the displacement limit on the trigger 6, allowing it to move horizontally. Since the second guide groove 62 is connected to the first guide groove 61, the slider 71 moves relative to the top of the second guide groove 62, and then, due to a downward extension of the other end of the second guide groove 62, the slider 71 falls to the bottom of the second guide groove 62, thereby resetting the ejector downwards.

Specifically, the displacement limit assembly 10 includes a slide frame 101 and a second resetting spring 102. The slide frame 101 is slidably arranged along the horizontal direction, and a slide direction of the slide frame 101 is perpendicular to that of the trigger 6. One end of the slide frame 101 is connected to the housing 1 via the second resetting spring 102. The slide frame 101 is provided with a blocking part 1011 and defined with an positioning groove 1012. A side wall of the blocking part 1011 abuts against that of the trigger 6, and the positioning groove 1012 is positioned at one side of the blocking part 1011 and has a T-shape. When the slide frame 101 moves horizontally for a certain distance, the blocking part 1011 is separated from the trigger 6, and the positioning groove 1012 makes a way for the trigger 6. The slider 71 correspondingly moves into the second guide groove 62

Specifically, in a natural state, the blocking part 1011 of the slide frame 101 blocks the trigger 6, limiting a lateral movement of the trigger 6 and preventing the slider 71 of the ejector from entering the second guide groove 62 of the trigger 6. When the slide frame 101 is pressed, the positioning groove 1012 makes a way for the trigger 6. The trigger 6 moves laterally under a drive of the first resetting spring 9, and the slider 71 of the ejector enters the second guide groove 62 to cause the ejector to fall down. After the slide frame 101 is resets under the drive of the second resetting spring 102, the ejector drives the trigger 6 to move, causing the trigger 6 to leave from the positioning groove 1012 and be limited again by the blocking part 1011 of the slide frame 101.

Furthermore, to enhance fun of the continuous electric flying disc launcher in this embodiment of the present application, a light assembly 8 is provided.

Specifically, the light assembly 8 includes an LED light board 81 and a lampshade 82. The LED light board 81 is fixed on the housing 1 and is inclined towards an upper side of the flying disc body 4. The lampshade 82 is inserted on the housing 1, and the LED light board 81 is electrically connected to the main control board 21, which controls the lighting and extinguishing of the LED. The lampshade 82 is positioned on one side of the LED light board 81.

When the user presses the trigger or launches the flying disc, the main control board 21 can control the LED light board 81 to light up according to the preset logic judgement. During a flight of the flying disc, a flashing effect of the LED light board 81 increases a visibility of the flying disc and adds fun and experience to the game. By providing the light assembly 8, the continuous electric flying disc launcher is more interesting and visually appealing during use, providing a user with a richer game experience.

Referring to FIGS. 2 and 4, the flying disc body 4 includes a bottom cover 41, a body 42, a light bead 43, and a kinetic energy circuit board 44. The body 42 covers an upper surface of the bottom cover 41, and the second convex block 421 and the second limit groove 422 both are positioned on the body 42. The light bead 43 and the kinetic energy circuit board 44 are arranged in the body 42, the light bead 43 penetrates downward through a lower surface of the bottom cover 41, and is electrically connected to the kinetic energy circuit board 44.

When the flying disc is ejected and begins to rotate, the kinetic energy circuit board 44 senses motion and generates corresponding electrical signals. These signals are transmitted to the light beads 43, triggering them to light up. Because the light bead 43 penetrates downward through the lower surface of the bottom cover 41, when the flying disc rotates, the lights will flash during the flight of the flying disc, increasing the visibility and fun of the flying disc.

An operational principle of the continuous electric flying disc launcher in this embodiment of the present application is as follows.

The user controls the trigger 6 to slide, which triggers the power supply module 2. The power supply module 2 provides power to the motor 32, causing it to start and begin to rotate, thereby driving the power output shaft 34 to rotate together. A plurality of the flying disc bodies 4 are sleeved on the power output shaft 34, with the first convex block 341 on the power output shaft 34 abutting against the second convex block 421 of the flying disc body 4, thereby driving an topmost flying disc body 4 to rotate synchronously. The limit assembly 5 ensures that only the topmost flying disc body 4 can be launched. When the user releases the trigger 6, it resets, controlling the action of the ejector 7 to push out the launched flying disc body 4. At the same time, as the launched flying disc body 4 is pushed out, a new flying disc body 4 automatically ascends to the topmost position, ready for the next launch. This enables continuous launching of flying disc. Each time the trigger 6 is actuated, the motor 32 drives the power output shaft 34 to rotate, and the ejector 7 pushes out the flying disc body 4 stacked on for launching. Meanwhile, the limit assembly 5 keeps a movement of the remaining flying disc bodies 4, while the ejector 7 pushes out the launched flying disc body 4 to make room for a new one. Users can continuously actuates the trigger 6 to enjoy the fun and convenience of continuous disc launching.

What is provided above is merely the preferred embodiments according to the present application, and the protection scope of the present application is not limited to the above embodiments. Therefore, any equivalent changes made based on the structure, shape, or principle of the present application should be encompassed within the scope of protection of the present application.

LISTING OF REFERENCE SIGNS

1 Housing
11 Accommodating Groove
12 Button
2 Power Supply Module
21 Main Control Board
22 Battery
23 Control Switch
24 Proximity Switch
3 Power Assembly
31 Support
311 Receiving Groove
32 Motor
33 Gear Assembly
34 Power Output Shaft
341 First Convex Block
4 Flying Disc Body
41 Bottom Cover
42 Body
421 Second Convex Block
422 Second Limit Groove
43 Light Bead
44 Kinetic Energy Circuit Board
5 Limit Assembly
51 First Limit Groove
52 Limit Block
6 Trigger
61 First Guide Groove
62 Second Guide Groove
7 Ejector
71 Slider.
8 Light Assembly
81 Led Light Board
82 Lampshade
9 First Resetting Spring.
10 Displacement Limit Assembly
101 Slide Frame
1011 Blocking Part
1012 Positioning Groove
102 Second Resetting Spring

What is claimed is:

1. A continuous electric flying disc launcher, comprising a housing, a power supply module, a power assembly, a plurality of flying disc bodies, a limit assembly, a trigger, and an ejector; wherein the housing acts as a carrier, the power supply module is installed in the housing, the power assembly comprises a motor and a power output shaft, the motor is installed in the housing, the motor is connected to the power supply module, the motor is configured to drive the power output shaft to rotate, the power output shaft extends beyond the housing, the plurality of flying disc bodies are sleeved on the power output shaft on top of each other, a side wall of the power output shaft is fixed with a first convex block, an inner wall of each of the plurality of flying disc bodies is fixed with a second convex block, the first convex block abuts against the second convex block of an uppermost flying disc body of the plurality of flying disc bodies, the limit assembly is positioned in the housing, the limit assembly is configured to limit remaining flying disc bodies of the plurality of flying disc bodies, the ejector is slidably arranged in the housing along a vertical direction, the ejector is configured to eject each of the plurality of flying disc bodies, the trigger is arranged in the housing, and the trigger is configured to trigger the power supply module and control an action of the ejector.

2. The continuous electric flying disc launcher according to claim 1, wherein the limit assembly is cylindrical, a side wall of the limit assembly is defined with a first limit groove into which the second convex block is inserted, the side wall of the limit assembly is fixed with a limit block, and the inner wall of each of the plurality of flying disc bodies is defined with a second limit groove into which the limit block is inserted.

3. The continuous electric flying disc launcher according to claim 1, wherein the power assembly further comprises a support and a gear assembly, the support is fixed in the housing, the limit assembly is integrated with the support, the support is defined with a receiving groove, the motor is arranged in the receiving groove, and the power output shaft is rotatably supported on the support, the gear assembly is arranged between the power output shaft and the motor, and the power output shaft extends in a same direction as that of the motor.

4. The continuous electric flying disc launcher according to claim 1, wherein a side wall of the trigger is defined with a first guide groove, the first guide groove is Z-shaped along a vertical direction, a side wall of the ejector is fixed with a slider, the slider is slidably arranged in the first guide groove along a direction of the first guide groove, and a first resetting spring is arranged between the trigger and the housing to realize resetting of the trigger.

5. The continuous electric flying disc launcher according to claim 4, wherein the side wall of the trigger is defined with a second guide groove, a first end of the second guide groove is connected with a top of the first guide groove, and a second end of the second guide groove extends downward to a bottom of the trigger, a displacement limit assembly is further arranged between the trigger and the housing, and the displacement limit assembly is configured to control a displacement stroke of the trigger.

6. The continuous electric flying disc launcher according to claim 5, wherein the displacement limit assembly comprises a slide frame and a second resetting spring, the slide frame is slidably arranged along a horizontal direction, one end of the slide frame is connected to the housing via the second resetting spring, the slide frame is provided with a blocking part and defined with a positioning groove, a side wall of the blocking part abuts against the side wall of the trigger, and the positioning groove is positioned at one side of the blocking part, and, when the slide frame is moved horizontally by a distance, the blocking part is separated from the trigger, the positioning groove makes way for the trigger, and the slider is correspondingly moved into the second guide groove.

7. The continuous electric flying disc launcher according to claim 1, wherein the power supply module comprises a main control board, a battery, a control switch, and a proximity switch, the main control board is electrically connected to the battery, the proximity switch is fixed on the main control board and positioned on one side of the trigger, the control switch is fixed on the housing, and a button is slidably arranged on the housing at a position corresponding to the control switch, and both of the control switch and the proximity switch are electrically connected to the main control board.

8. The continuous electric flying disc launcher according to claim 7, further comprising a light assembly, the light assembly comprises a light emitting diode (LED) light board and a lampshade, the LED light board is fixed on the housing and inclined towards an upper side of the plurality of flying disc bodies, the lampshade is inserted in the housing, the LED light board is electrically connected to the main control board, and the lampshade is positioned on one side of the LED light board.

9. The continuous electric flying disc launcher according to claim 8, wherein each of the plurality of flying disc bodies comprises a bottom cover, a body, a light bead, and a kinetic energy circuit board, the body covers an upper surface of the bottom cover, the light bead and the kinetic energy circuit board are arranged in the body, the light bead penetrates downward through a lower surface of the bottom cover, and the light bead is electrically connected to the kinetic energy circuit board.

\* \* \* \* \*